(No Model.)

A. F. MOLITOR.
FASTENING FOR HARROW TEETH.

No. 534,567. Patented Feb. 19, 1895.

Witnesses
Amy J. Williams
Cyril E. Lothrop

Inventor
Aron F. Molitor
by Geo. H. Lothrop
atty.

THE NORRIS PETERS CO., PHOTO-LITHO., WASHINGTON, D. C.

UNITED STATES PATENT OFFICE.

ARON F. MOLITOR, OF LANSING, MICHIGAN, ASSIGNOR TO THE E. BEMENT & SONS, OF SAME PLACE.

FASTENING FOR HARROW-TEETH.

SPECIFICATION forming part of Letters Patent No. 534,567, dated February 19, 1895.

Application filed December 12, 1894. Serial No. 531,590. (No model.)

*To all whom it may concern:*

Be it known that I, ARON F. MOLITOR, of Lansing, in the county of Ingham and State of Michigan, have invented a new and useful Improvement in Fastenings for Harrow-Teeth, of which the following is a specification.

My invention relates to fastenings for harrow teeth, and consists in the improvements hereinafter described and pointed out in the claims.

Figure 1:
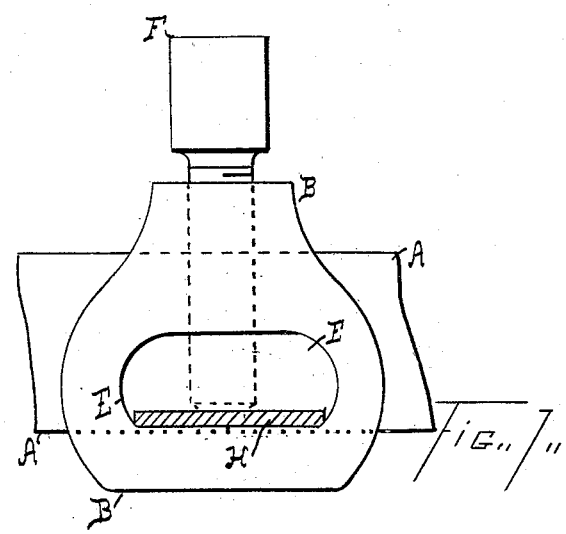
Figure 2:
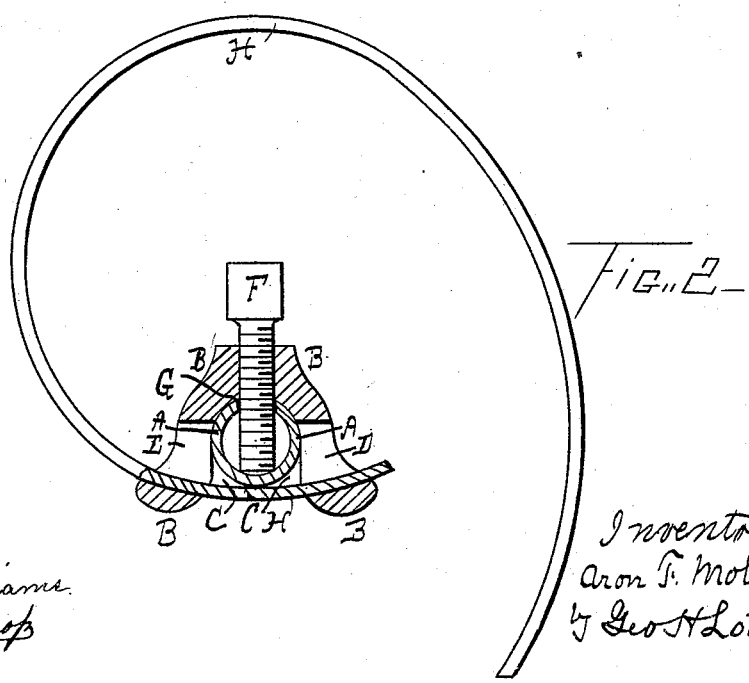

Figure 1 is an end view of the fastening embodying my invention, a portion of a harrow tooth being shown secured in place; and Fig. 2 is a side elevation partly in section, the section being taken on the line X X, Fig. 1.

My invention is applicable to that kind of a harrow in which the teeth are fastened to tubular rods which are supported on the frame.

A is a portion of one of said tubular rods.

B is a metal clip. The clip B is provided with an aperture C, which extends transversely across it, and is open at the bottom. The aperture C is of a width equal to the diameter of the rod A, and is formed at the top to fit the surface of said rod.

D E are holes formed in the side of the clip B, and extending from the ends of said clip into the aperture C. Said holes are opposite each other and are of a width equal to the width of the harrow tooth, and their lower walls are formed to fit said tooth as shown in Fig. 2.

F is a set-screw extending through a threaded hole in the tip of the clip B, at the center of said clip.

G is a hole formed through the wall of the rod A, at the top.

K is the tooth of the harrow.

The method of securing the harrow tooth in place is as follows: The clip B is placed over the rod A, at the place where it is desired to secure the tooth, said rod coming within the aperture C. The set screw F is screwed through the hole G. The end of the harrow tooth is then passed under the rod A, through the holes D and E. Said set screw is then screwed down against the inside of the rod A, at the bottom and set up tight, thus forcing the rod A against the harrow-tooth and the tooth against the lower walls of the holes D and E, and clamping the tooth firmly in place.

It will be noticed that the clamping point of the set-screw F is close to the opposing clamping surface, and that it is impossible for the clip B to work loose so as to slide along upon the rod A.

Having fully described my invention, what I claim, and desire to secure by Letters Patent, is—

1. The combination of the clip B, the set screw F, the tubular rod A, and the harrow tooth H, said set screw passing through the wall of the rod A, setting up against the inside of said rod, and clamping said tooth between said rod and a portion of said block, substantially as shown and described.

2. In combination with the frame rod of a harrow a clip adapted to straddle said rod and having openings at right angles to said rod to receive the harrow tooth, a screw bolt threaded in said clip, and a hole in the upper wall of said rod to allow the screw bolt to impinge against the inner side of the lower wall, substantially as shown and described.

ARON F. MOLITOR.

Witnesses:
OSCAR HOLMSTEDT,
W. C. WALDING.